(12) United States Patent
Ma et al.

(10) Patent No.: US 10,333,565 B2
(45) Date of Patent: Jun. 25, 2019

(54) SAFE COMMUNICATION MODE FOR A HIGH SPEED LINK

(71) Applicant: Nvidia Corporation, Santa Clara, CA (US)

(72) Inventors: Dennis Ma, Santa Clara, CA (US); Marvin Denman, Santa Clara, CA (US); Eric Tyson, Santa Clara, CA (US); Stephen D. Glaser, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 15/993,192

(22) Filed: May 30, 2018

(65) Prior Publication Data
US 2018/0278278 A1 Sep. 27, 2018

Related U.S. Application Data

(63) Continuation of application No. 14/933,855, filed on Nov. 5, 2015, now Pat. No. 10,003,362.

(51) Int. Cl.
H04B 1/04 (2006.01)
H04M 7/12 (2006.01)
G06F 21/83 (2013.01)
H04L 25/02 (2006.01)

(52) U.S. Cl.
CPC ........... *H04B 1/04* (2013.01); *H04L 25/0264* (2013.01); *H04L 25/0276* (2013.01); *G06F 21/83* (2013.01); *H04M 7/126* (2013.01)

(58) Field of Classification Search
CPC ......... H01L 21/67715; H01L 21/67736; H01L 21/67775; G06F 21/83; H04M 7/126
See application file for complete search history.

(56) References Cited

U.S. PATENT DOCUMENTS

| 3,638,125 | A | * | 1/1972 | Goell | H04L 27/2273 329/308 |
| 8,897,352 | B2 | | 11/2014 | Cha et al. | |
| 2008/0126857 | A1 | | 5/2008 | Basham et al. | |
| 2012/0272059 | A1 | | 10/2012 | Shetty et al. | |
| 2012/0317607 | A1 | | 12/2012 | Wyatt et al. | |
| 2013/0101069 | A1 | | 4/2013 | Barner | |
| 2014/0114887 | A1 | * | 4/2014 | Iyer | G06N 99/005 706/12 |
| 2014/0269768 | A1 | | 9/2014 | Vermani et al. | |
| 2015/0205616 | A1 | | 7/2015 | Thai et al. | |
| 2016/0285624 | A1 | * | 9/2016 | Wagh | H04B 3/46 |
| 2017/0017604 | A1 | * | 1/2017 | Chen | G06F 13/4221 |

* cited by examiner

*Primary Examiner* — Ross Varndell
(74) *Attorney, Agent, or Firm* — Rich Domingo; Parker Justiss, P.C.

(57) ABSTRACT

A transmitter for a high speed serial communications link, a serial communications link, and a receiver for a high speed serial communications link are disclosed herein. In one embodiment, the transmitter includes: (1) a communications interface connected to a transmission medium having multiple lanes, and (2) a safe mode circuit coupled to the communications interface and configured to send data over the transmission medium in a safe mode, wherein in the safe mode at least one of the lanes is dedicated to transmitting a link detect signal for link detection.

20 Claims, 3 Drawing Sheets

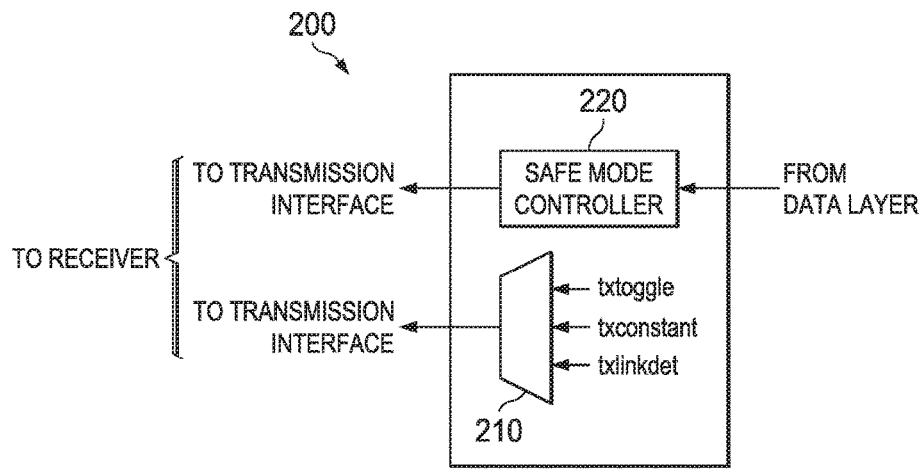
FIG. 2
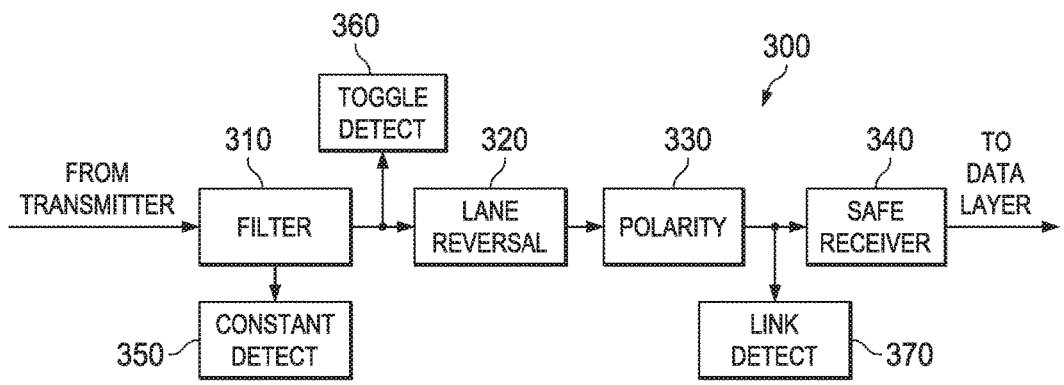
FIG. 3
TABLE ONE
| | PATTERN | CHIP A TX LANES | | | | | | | | CHIP B TX LANES | | | | | | | |
|---|---|---|---|---|---|---|---|---|---|---|---|---|---|---|---|---|---|
| | | 7 | 6 | 5 | 4 | 3 | 2 | 1 | 0 | 7 | 6 | 5 | 4 | 3 | 2 | 1 | 0 |
| 410 | 1 | 1 | 1 | 1 | 1 | T | 1 | 1 | 1 | 1 | 1 | 1 | 1 | T | 1 | 1 | 1 |
| 420 | 2 | 1 | 1 | 1 | 1 | 1 | 1 | 1 | 1 | 1 | 1 | 1 | 1 | 1 | 1 | 1 | 1 |
| 430 | 3 | 1 | 1 | 1 | 1 | 1 | 0 | 1 | 1 | 1 | 1 | 1 | 1 | 1 | 0 | 1 | 1 |
| 440 | 4 | R | D | D | D | 1 | 0 | D | S | R | D | D | D | 1 | 0 | D | S |
T = TOGGLING  R = RESERVED
S = STROBE    D = DATA
FIG. 4

SAFE COMMUNICATION MODE FOR A HIGH SPEED LINK

CROSS-REFERENCE TO RELATED APPLICATION

This application is a continuation of U.S. patent application Ser. No. 14/933,855, entitled "SAFE COMMUNICATION MODE FOR A HIGH SPEED LINK", filed on Nov. 5, 2015. The above-listed pending application is commonly assigned with the present application and is incorporated herein by reference in its entirety.

TECHNICAL FIELD

This application is directed, in general, to high speed serial links and, more specifically, to safe, secure communication over high speed serial links.

BACKGROUND

Some computers use multiple processors and even different type of processors to improve application performance. For example, computers often include a central processing unit (CPU) and a graphics processing unit (GPU). Various interconnects have been used to provide communication between the multiple processors. However, as the processing speed of processors continues to increase, so does the need for improved interconnects.

A high speed serial link is one type of interconnect that is used to communicate between the various processors and devices of a computer. As such, high speed serial links are often used for inter-device communication on circuit boards. Before communicating at a high speed, a high speed serial link requires careful training and calibration before it is able to successfully transmit data. During the training process, communication between the transmitter and the receiver is difficult since the link has not been trained.

SUMMARY

In one aspect, the disclosure provides a transmitter for a high speed, serial communications link. In one embodiment, the transmitter includes: (1) a communications interface connected to a transmission medium having multiple lanes, and (2) a safe mode circuit coupled to the communications interface and configured to send data over the transmission medium in a safe mode, wherein in the safe mode at least one of the lanes is dedicated to transmitting a link detect signal for link detection.

In another aspect, a serial communications link is provided. In one embodiment, the serial communications link includes: (1) a transmitter having both a safe mode data transmit path and a high speed data transmit path, (2) a transmission medium having multiple lanes, and (3) a receiver coupled to the transmitter via the transmission medium and configured to receive data from the transmitter over at least some of the multiple lanes in both a safe mode and a high speed mode, wherein at least one of the lanes is dedicated to link detection and the transmitter transmits a link detect pattern to the receiver over the at least one of the lanes for the safe mode.

In yet another aspect, a receiver for a high speed, serial communications link is disclosed. In one embodiment, the receiver includes: (1) a receive interface connected to a transmission medium having multiple lanes, (2) receiving circuitry coupled to the receive interface and configured to receive data from the transmission medium in a high speed mode, and (3) a safe receive circuit, different than the receiving circuitry, coupled to the receive interface and configured to receive data from the transmission medium in a safe mode, wherein in the safe mode at least one of the lanes is dedicated to a link detect signal for link detection.

BRIEF DESCRIPTION

Reference is now made to the following descriptions taken in conjunction with the accompanying drawings, in which:

FIG. 2 illustrates a schematic diagram of an embodiment of safe transmission circuit constructed according to the principles of the disclosure;

FIG. 3 illustrates a schematic diagram of an embodiment of a safe receiving circuit constructed according to the principles of the disclosure;

FIG. 4 illustrates a table, Table One, including safe mode data patterns that are used in one embodiment to initialize a safe mode and transmit data during a safe mode according to the principles of the disclosure.

DETAILED DESCRIPTION

Figure 1:
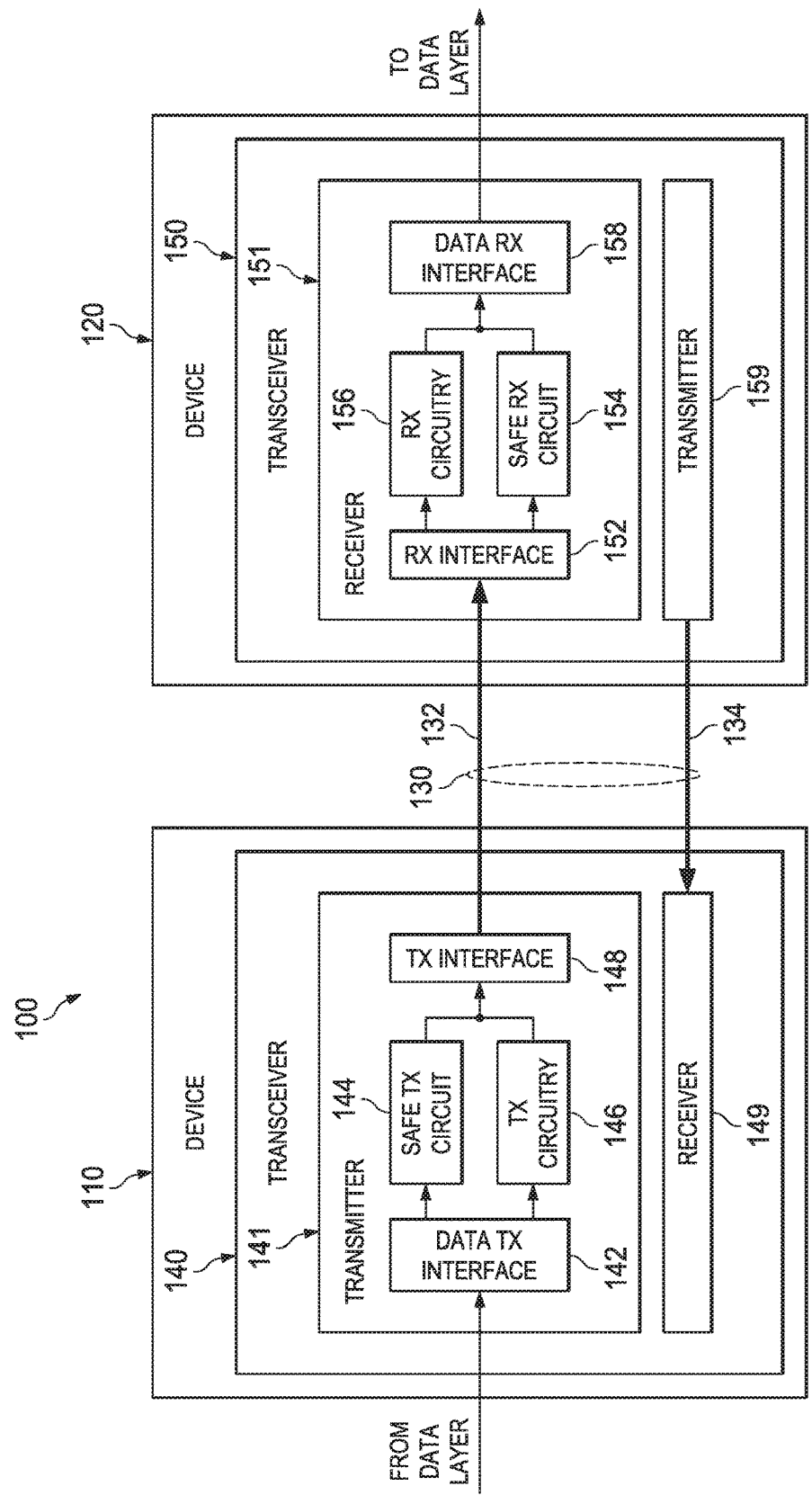
FIG. 1 illustrates a block diagram of an embodiment of an electronic circuit board constructed according to the principles of the disclosure.

High speed serial links often include multiple wires or lanes for communication. If the high speed serial link includes multiple lanes for communication, the multi-lane link is trained with all of the lanes in high speed operation. Merely training each lane one lane at a time at high speed operation is not sufficient. During the training process, communication between the receiver and the transmitter is difficult since the link has not been trained.

Accordingly, the disclosure provides a separate safe mode of operation for safely communicating over a high speed serial link before the link can be trained for high speed operation. In some embodiments, high speed operation is or is about 20 GHz and is the normal operation of the high speed serial link. Generally for a high speed serial link, multiple bits are serially transmitted and/or received for each "native" clock cycle or the transmitter or receiver. Unlike high speed operation, the disclosed safe mode transmits and detects bit values without training. In one embodiment, the safe mode uses bit replication to be able to sample data without training. In another embodiment, the safe mode encodes bit values into a frequency for transmission and detects the frequency at the receiver to distinguish between a bit value of zero and a bit value of one. The encoding and detection can be done each cycle in the transmission and receiving interfaces of the transmitter and receivers so that the remainder of the safe mode protocol does not care which transmission method is used.

Additionally, the disclosed safe mode uses setup and hold times to advantageously sample data without deskewing the multiple lanes of a high speed serial link. The set-up and hold timing margins are set at sufficiently large values around a data strobe to allow data sampling in the safe mode without training. In many embodiments, the set-up and hold times in the safe mode are fully programmable. In some embodiments, the set-up and hold margins can be based on multiples of clock cycles.

In contrast to a normal high speed operating mode, safe mode is tolerant that the two sides of a communications link, the transmitter and the receiver, may not be operating at the same clock rate. Thus, there is no need for deskewing and checking of the transmitter and receiver clocks before transmitting in safe mode.

A typical training mode used with high speed serial links is electrically and physically similar to a normal operating mode except at a reduced operating speed, for example 2.5 GHz instead of 20 GHz. The disclosed safe mode of operation, however, communicates at a slow, conservative speed according to a different protocol than normal high speed operation. In one embodiment, the safe mode operating speed is 100 MHz.

In some embodiments, the safe mode operating speed is programmable. The programmable operating speed can be based on the nominal clock cycle of the high speed serial link. In one embodiment, the safe mode operating speed is $1/16^{th}$ the nominal clock rate of 20 GHz or 1.25 GHz. Multiple hold cycles can be employed to reduce the actual operating speed to below 100 MHz. With a programmable operating speed, a designer can advantageously select different operating speeds for different applications. For example, the operating speed for safe mode can be set below one MHz to the KHz range for testing new chips on emulators.

An interconnect having a safe mode as disclosed herein has multiple advantages compared to conventional inter-device connections. For example, when at a point to transition to high speed, the communications link can do a direct jump from safe mode to high speed mode. Additionally, safe mode is essentially invisible to the physical circuitry of the communications link since the speed of operation as seen by the physical circuit is not changed. Thus, the safe mode does not rely on the physical circuit to lock in on a certain high operating speed. The safe mode may use bit replication to slow down the effective rate on the lanes of the communications link. The safe mode may also use frequency encoding and decoding averaged over time to allow for a communication mechanism that requires minimum switching rates but has significant bit error rates without training. The safe mode is also agnostic to a cyclic redundancy check since running with such mass replication allows using digital filtering to recover values trying to transmit.

The disclosure provides a high speed serial link having a transmitter, a transmission medium, and a receiver that are configured to operate in a safe mode in addition to a high speed mode. The transmitter and the receiver each include a safe mode path that is parallel to the high speed paths of the transmitter and the receiver. A bit replication receiver counts zeroes and ones to determine whether a signal's value is zero, one, or ambiguous. A frequency detector receiver monitors the frequency of received data over a period of time to determine whether the current value of received data should be zero, one, or ambiguous. The receiver then applies a filter to the received data to remove noise and short term errors therefrom.

In safe mode, different lanes of the high speed serial link are dedicated to particular functions. In some embodiments, certain lanes or a lane are dedicated to communicating data, to link detection, and to data strobe. In one embodiment, two lanes are dedicated to link detection, one lane to a data strobe, and four lanes to communicating data. In safe mode, not all of the lanes are used in some embodiments. Consider, for example, the above embodiment and a link of eight lanes. Two lanes are dedicated to link detection, one lane to a data strobe, four lanes to communicating data and the remaining lane is not used.

When entering safe mode, initializing signals or patterns are sent by the transmitter to the receiver. In one embodiment, the transmitter sends a slow toggling value on one lane to detect lane reversal. The transmitter then sends a known constant pattern on all lanes to detect polarity inversion on each lane.

When transitioning to a high speed mode of communication from the safe mode, the transmitter uses safe mode data to communicate to the receiver the transition. After communicating the transition, the transition consists of a training mode that trains the communications link by, for example, sending high speed data patterns to establish the high speed link. When transitioning from high speed operation to safe mode, the intent to transition is communicated by using high speed operations. A known link detect pattern is then transmitted for a sufficient time to ensure that the RX has transitioned to safe mode. Thereafter, safe mode can begin.

Turning now to the figures, FIG. 1 illustrates a block diagram of an embodiment of an electronic circuit board 100 constructed according to the principles of the disclosure. The circuit board 100 can be a motherboard of a computer, part of a multi-chip module (MCM), or another printed circuit board (PCB). The circuit board 100 includes a first device 110 and a second device 120 connected via a transmission medium 130. The circuit board 100 is an example of an electronic system. In other electronic system embodiments, the first device 110 and the second device 120 may not be on the same circuit board. Instead, the first device 110 and the second device 120 can be on different circuit boards that are connected through a connector. One skilled in the art will understand that the circuit board 100 can include other components that are not illustrated or discussed herein.

The first device 110 and the second device 120 may be different die, different packages on the circuit board 100 or on separate circuit boards. The first device 110 and the second device 120 can be either the same type of devices or different type of devices. In one embodiment, the first device 110 is a GPU and the second device 120 is a CPU. In other embodiments, the first device 110 and the second device 120 are both GPUs. The first and second devices 110, 120, can also be switches, repeaters, memory controllers, etc. In some embodiments, both the first device 110 and the second device 120 are CPUs. The first device 110 and the second device 120 each include transceivers, transceiver 140 and transceiver 150.

The transmission medium 130 provides a communication path between the first device 110 and the second device 120 via the transceivers 140, 150. The transmission medium 130 can be a physical or a non-physical medium. In one embodiment, the transmission medium 130 is wires. The wires can be conventional conductors typically employed on circuit boards to communicatively couple devices. In some embodiments discussed herein, the transmission medium 130 is a link that includes sixteen wires or lanes between the transceivers 140 and 150. The transmission medium 130 includes a sub-link 132 of eight lanes that provides a point-to-point connection from a transmitter 141 of the transceiver 140 to a receiver 151 of the transceiver 150. The transmission medium 130 includes an additional sub-link 134 of eight lanes that provides a point-to-point connection from a transmitter 159 of the transceiver 150 to a receiver 149 of the transceiver 140.

The transmitter 141 includes a data transmit interface 142, a safe transmit circuit 144, transmit circuitry 146, and a transmit interface 148. The data transmit interface 142 is configured to communicate with a data layer and receive therefrom data to communicate to the second device 120. In one embodiment, the data transmit interface 142 receives data in 128 bit chunks referred to herein as a Flit. The data transmit interface 142 is connected to the safe transmit circuit 144 and the transmission circuitry 146, and provides the Flit of data to either of these separate transmission paths depending on if the data is being sent in safe mode or at high speed. In one embodiment, the transceiver 140 controls entering the safe mode. In another embodiment, the decision to enter safe mode can be determined external to the transceiver 140. The intent to change is communicated from the transmitter 141 to the receiver 151. The transmission circuitry 146 includes conventional components used for the normal high speed operation of a serial link transmitter, such as a training pattern generator, a scrambler, etc. The safe transmit circuit 144 includes a safe mode controller and a safe mode initializer (not illustrated) that will be discussed in more detail with respect to FIG. 2.

The transmit interface 148 is connected to both of the transmission paths and is also connected to the transmission medium 130 via an interface (not illustrated) for transmitting the data to the receiver 151 of the second device 120 over the sub-link 132 in either the safe mode or in a normal mode of operation. The interface can be for wired links, optical links, etc. In one embodiment, the interface can be for infra-red signaling. In one embodiment, the transmit interface 148 is a multiplexer. The receiver 151 includes a receive interface 152, a safe receive circuit 154, receiving circuitry 156 and a data receiving interface 158. The receive interface 152 receives the transmitted data and delivers it to either the safe receive circuit 154 or the receiving circuitry 156 depending on if the data was transmitted according to the safe mode or high speed transmission. The communication mode of the data can be determined by a communication from the transmitter 141 to the receiver 151 indicating a change in the mode. In cases where there is communication difficulties, the link detect pattern can be transmitted and detected by the receiver 151 to indicate that safe mode is beginning. In high speed operation, the receive interface 152 is configured to perform synchronization and deskewing of the lanes. The data receive interface 158 is connected to both of the separate receiving paths, the safe receive circuit 154 and the receiving circuitry 156, and provides received data to a data layer of the second device 120 for processing. The receiver 149 of the transceiver 140 includes the same circuitry as described with respect to the receiver 151 of the second device 120. Additionally, the transmitter 159 of the transceiver 150 includes the same circuitry as described with respect of the transmitter 141 of the first device 110.

The transceiver 140, the transceiver 150, and the transmission medium 130 provide a high speed interconnect between the first device 110 and the second device 120. Each of the above noted transmitters and receivers of the transceivers 140, 150, include a separate safe circuit that provides a safe mode of operation. FIG. 2 and FIG. 3 illustrate embodiments of a safe transmission circuit and a safe receiving circuit that can be the safe transmission and receiving circuits of FIG. 1.

FIG. 2 illustrates a schematic diagram of an embodiment of safe transmission circuit 200 constructed according to the principles of the disclosure. The safe transmission circuit 200 includes a safe mode initializer 210 and a safe mode controller 220. The safe transmission circuit 200 can be, for example, the safe transmission circuitry 144 of the first device 110 in FIG. 1. The safe transmission circuit 200 provides a safe mode transmission path for transmitting the data to a remote receiver according to the safe mode.

The safe mode initializer 210 is configured to form a communications link for safe mode. The safe mode initializer 210 initializes or transitions to safe mode by sending distinct initializing patterns to the remote receiver to establish the communications link in safe mode. The initializing patterns detect lane reversals and polarity before starting safe mode. Thus, the initializing patterns indicate how a link is wired so that safe mode will function properly. In one embodiment, the safe mode initializer 210 is a multiplexer that sends the initializing patterns to the receiver one at a time. The safe mode controller 220 is configured to direct the safe mode initializer 210 in one embodiment. In some embodiments, communication between the transmitter and the receiver of the same transceiver is needed to control the safe mode initializer 210.

The first pattern is a toggle pattern, "txtoggle" in FIG. 2, that is used to determine lane reversal. The toggle pattern toggles between zero and one at a periodic, known, and programmable slow frequency. The receiver can detect a lane toggling within an acceptable range of the target toggle frequency to determine lane reversal. The second pattern is a constant pattern, "txconstant" in FIG. 2, that is used to determine polarity. The third initializing pattern is a link ready detection signal, "txlinkdet" in FIG. 2, that is used to indicate the transmitter is ready to transmit safe mode data. The safe mode controller 220 can direct sending the patterns over the safe mode initializer 210. Table One in FIG. 4 provides examples of the initializing patterns sent via the safe mode initializer 210.

The safe mode controller 220 is configured to direct transmission of data to the receiver in safe mode after the communications link is set-up for safe mode by the safe mode initializer 210. In one embodiment, the safe mode controller 220 transmits four bits at a time in safe mode. For example, the safe mode controller 220 receives a Flit of data from the data layer via a data interface and sends out the 128 bits of the Flit four bits at a time. In other embodiments, the safe mode controller 220 can be configured to transmit the data using a width different than four bits.

Figure 5:
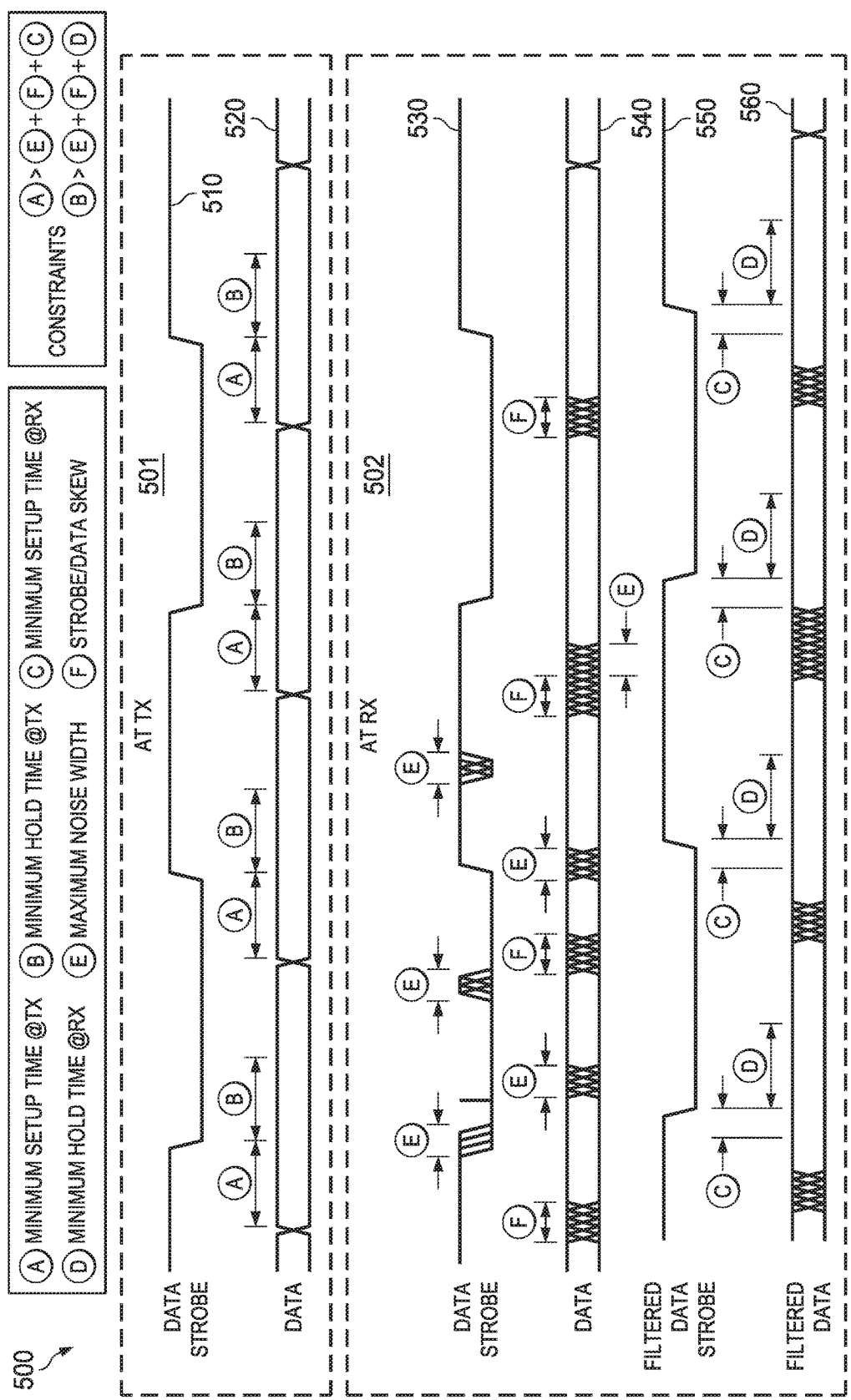
FIG. 5 illustrates a signaling diagram for one embodiment of transmitting data in a safe mode according to the principles of the disclosure.

FIG. 4 and FIG. 5 illustrate examples of safe patterns and safe mode signaling controlled by the safe mode controller 220. Table One in FIG. 4 provides an example of transmitting data in a safe mode using a sub-link that has eight lanes. Row 440 provides a pattern for transmitting data in safe mode using seven of the eight lanes. Four lanes are used for transmitting data, one lane is used for a strobe, two lanes are used for link detect and one lane is reserved. The two link detect lanes are used to inform the receiver that safe mode is being used. FIG. 5 illustrates the transmission of data using safe mode signaling as disclosed herein. The safe mode controller 220 is configured to establish a set-up time and a hold time for transmitting the data in safe mode. The set-up and hold times are programmable for the transmitter to meet whatever requirements the receiver has for set-up and hold. The lengths of the set-up and hold times are based on historical knowledge and experience, and are established to compensate for possible skewing and noise over the transmission medium. In one embodiment, the safe mode controller 220 sets a minimum set-up time to be greater than a total of a maximum noise width, a strobe/data skew and a minimum set-up time of the receiver. The safe mode controller 220 is also configured to set a minimum hold time to be greater than a total of a maximum noise width, a strobe/data skew and a minimum hold time of the receiver.

FIG. 3 illustrates a schematic diagram of an embodiment of a safe receiving circuit 300 constructed according to the principles of the disclosure. The safe receiving circuit 300 provides a safe receiving path that includes logic circuitry denoted as a filter 310, lane reversal 320, polarity 330, and a safe receiver 340. The safe receiving circuit 300 also includes logic circuitry for a constant detect 350, a toggle detect 360 and a link detect 370. The safe receiving circuit 300 receives data over the transmission medium via a receiver interface.

The filter 310 is configured to filter out noise from the received data that has a duration less than a maximum noise width on both the strobe and data lanes. The maximum noise width is programmable. In some embodiments, changes on filtered signals will not be recognized until the new value is stable for more than the maximum noise width. The filtered data will be sampled at the safe receiver 340 on each edge of the filtered strobe. The safe receiver 340 requires a minimum setup and hold time of filtered data relative to the filtered strobe. The lane reversal 320 determines if a lane reversal is needed. In one embodiment, the lane reversal 320 determines if lane reversal is needed by detecting for a toggle value on lanes 3 or 4 and applies lane reversal if needed. The polarity 330 determines for each lane if polarity reversal is needed. In one embodiment, the polarity 330 determines if polarity reversal is needed based on the constant pattern received after the heartbeat. Needed lane reversal and polarity inversion are performed in the receiver. Thereafter, the transmitter sends the link detect pattern. The link detect 370 is configured to detect the link signal from the transmitter. In one embodiment, the link detect 370 is connected to lanes 2-3 after lane reversal correction and polarity correction to detect the link detect signal and begin operating in safe mode. The safe receiver 340 then receives and samples the received data on the designated data lanes. Regarding Table One and row 440, the designated data lanes are one, four, five and six.

The constant detect 350 is connected to the filter 310 and is configured to determine if a constant signal is being received on all of the lanes. The toggle detect 360 is used to detect the toggling value on lane 3 or on lane 4. In some embodiments, the constant detect 350 is also coupled to the link detect 370.

FIG. 4 illustrates a table, Table One, including safe mode data patterns that are used in one embodiment to initialize a safe mode and transmit data during a safe mode according to the principles of the disclosure. Chip A and Chip B noted in Table One can be the first device 110 and the second device 120 of FIG. 1. The link between Chip A and Chip B corresponds to sixteen lanes with two sub-links of eight lanes. The data patterns of Table One correspond to the signals communicated between the safe transmit and receive circuits 200, 300, of FIGS. 2 and 3.

Safe mode operation provides highly reliable communication over a high speed serial link with little or no advance training. Safe mode uses high speed serial signaling with bit replication and can tolerate different frequency clocks on the transmit and receive ends of a sub-link. In one embodiment represented by the signal patterns in Table One, link detect for safe mode operation occurs when lane three has a constant value of one and lane two has a constant value of zero.

Pattern 1 in row 410 is a "heartbeat" pattern that is sent to the remote receiver. The "heartbeat" pattern includes a slow toggle of lane 3, represented by the "T." The transmitter will toggle this signal for a designated number of cycles. In one embodiment, the receiver is configured to detect this signal toggling between every designated number of cycle divided by two and twice the designated number of cycles. When the heartbeat has been sent and a heartbeat is being received, the transmitter will send pattern 2 from row 420 which is a constant value on all lanes. If the heartbeat is received on lane 4, lane reversal is needed. The constant received after the heartbeat tells the receiver which lanes need polarity reversed. After the polarity inversion constant has been sent and received, the transmitter will send pattern 3 from row 430 which is link detect on lanes 2 and 3. Link detect is a constant value of the proper values. Once link detect has been sent and received, the transmitter and the receiver are in safe mode and are capable of transmitting and receiving data respectively. In one embodiment, the link detect signals on lanes 2 and 3 must be zero and one, respectively, to indicate that the sub-link is in safe mode.

Row 430 indicates the pattern used in one embodiment to transmit data in the safe mode. In row 440, S is for strobe, R is for reserved and D is for data. The strobe signal is sent on lane 0 and is essentially a clock signal used to sample data, wherein the data is sampled around the edge of the strobe. Data is sent on lanes one, four, five and six. Bit zero of the four data bits use lane one. Thus, bits zero, four, eight, . . . , 124 of a Flit use lane one. Similarly, data bits 1, 2, and 3 of the Flit use lanes 4, 5, and 6 to transmit four bits at a time. For the disclosed embodiment, the transmitter will drive lane seven to one and the receiver will not use it. As indicated in FIG. 5, the receiver will apply filtering to all lanes before using their values. FIG. 5 illustrates a signaling diagram for one lane designated to transmit data according to an embodiment disclosed herein.

Turning now to FIG. 5, illustrated is a signaling diagram 500 for one embodiment of transmitting data in a safe mode according to the principles of the disclosure. FIG. 5 represents transmitting and receiving a signal in safe mode on a single data lane. One skilled in the art will understand the same signaling is performed on each of the data lanes. The signaling diagram 500 is divided into a transmitting section 501 that occurs at the transmitter and a receiving section 502 that occurs at the receiver. For FIG. 5, "A" is the minimum set-up time at the transmitter, "B" is the minimum hold time at the transmitter, "C" is the minimum set-up time at the receiver, "D" is the minimum hold time at the receiver, "E" is the maximum noise width and "F" is the strobe/data skew.

In one embodiment, the following constraints are employed in determining the minimum set-up and hold times for the transmitter, i.e., in determining A and B. As illustrated in FIG. 5, A>E+F+C, and B>E+F+D. With these constraints, data can be communicated in the safe mode without the need for training as when employing the high speed mode of operation.

The basic safe mode signaling is to transmit data and then after a programmable minimum setup time toggle the strobe of strobe lane 510. Data on data lane 520 is held constant for a programmable minimum hold time after the strobe is toggled. This is repeated to transmit each group of bits in the safe mode. The width of safe mode data for each strobe edge is implementation dependent.

The receiver will filter out noise with duration less than the maximum noise width on both strobe and the data lanes, e.g., strobe lane 530 and data lane 540. The maximum noise width is programmable. Changes on filtered signals will not be recognized until the new value is stable for more than the maximum noise width. The filtered data, represented by signal 560, will be sampled at the receiver on each edge of the filtered strobe, represented by signal 550. The receiver requires a minimum setup and hold time of filtered data 560 relative to filtered strobe 550.

The transmitter has a programmable setup and hold time for data relative to strobe that will likely be significantly larger than the minimum setup and hold time at the receiver. The transmitter must account for worst case strobe to data skew, maximum noise width, and filter delay to compute the required minimum setup and hold times. Setup and hold times at the transmitter are specified as a number of transmission clocks. As such, the granularity depends on the frequency of that clock. Additionally, the programmed setting is a function of the frequency of that clock.

FIG. 5 illustrates that the minimum setup time at the transmitter (A) must be large enough to guarantee that the minimum setup time at the receiver (C) is met. The same applies for the relationship of hold time at the transmitter (B) and hold time at the receiver (D). Safe mode has a single data strobe and an implementation dependent number of lanes of data bits allowing it to transmit an implementation dependent number of bits on each edge of the data strobe. A single data strobe lane can be employed for sampling of one or more data lanes transmitted with setup time to data strobe lane edge and hold time to data strobe lane edge.

The transmitter will transmit a Flit from the data layer and transmit all 128 bits using safe mode signaling. After a Flit has been transmitted, the transmitter can transmit the next Flit from the data layer if one is available. The receiver will receive all 128 bits of a Flit using the safe mode signaling. The Flit is then sent to the data layer of the receiver for processing.

Those skilled in the art to which this application relates will appreciate that other and further additions, deletions, substitutions and modifications may be made to the described embodiments.

What is claimed is:

1. A transmitter for a high speed, serial communications link, comprising:
   a communications interface connected to a transmission medium having multiple lanes; and
   a safe mode circuit coupled to said communications interface and configured to send data over said transmission medium in a safe mode, wherein in said safe mode at least one of said lanes is dedicated to transmitting a link detect signal for link detection,
   said safe mode circuit having a safe mode controller configured to establish a minimum set-up time for said safe mode, wherein said minimum set-up time is greater than a total of a maximum noise width, a strobe/data skew and a minimum set-up time of a receiver connected to said transmission medium.

2. The transmitter as recited in claim 1 further comprising transmission circuitry, different than said safe mode circuit, coupled to said communications interface and configured to send data over said transmission medium in a high speed mode.

3. The transmitter as recited in claim 1 wherein said link detect signal is a constant value.

4. The transmitter as recited in claim 1 wherein in said safe mode, at least two of said lanes are dedicated to link detection.

5. The transmitter as recited in claim 1 wherein in said safe mode, another one of said lanes is dedicated to a data strobe and different ones of said lanes are dedicated to transmit said data in said safe mode.

6. The transmitter as recited in claim 1 wherein in said safe mode, two of said lanes are dedicated to link detection, one of said lanes is dedicated to a data strobe, and four of said lanes are dedicated to transmit said data in said safe mode.

7. The transmitter as recited in claim 1 wherein said safe mode controller is further configured to establish a minimum hold time for said safe mode, wherein said minimum hold time for said safe mode is greater than a total of said maximum noise width, said strobe/data skew and a minimum hold time of said receiver.

8. The transmitter as recited in claim 1 wherein said safe mode circuit encodes said data with bit replication to send said data over said transmission medium in said safe mode.

9. The transmitter as recited in claim 1 wherein said safe mode circuit encodes said data as frequencies to send said data over said transmission medium in said safe mode, wherein separate frequencies are used to represent a value of zero and a value of one.

10. The transmitter as recited in claim 1 wherein said safe mode circuit sends said data over said transmission medium in a safe mode independent of training said transmission medium for high speed operation.

11. The transmitter as recited in claim 1 wherein said safe mode circuit includes a safe mode initializer coupled to said communications interface and a safe mode controller coupled to said communications interface, wherein said safe mode initializer is configured to set-up said serial communications link for said safe mode and said safe mode controller is configured to direct transmission of said data in said safe mode after said set-up.

12. The transmitter as recited in claim 11 wherein said safe mode initializer and said safe mode controller employ safe mode data patterns to set-up said serial communications link for said safe mode and to direct transmission of said data in said safe mode after said set-up.

13. The transmitter as recited in claim 1 further comprising a high speed path and a data interface configured to receive data to transmit over said transmission medium, wherein said safe mode circuit and said high speed path are connected between said data interface and said communications interface and provide separate communication paths therebetween.

14. A serial communications link, comprising:
   a transmitter having both a safe mode data transmit path and a high speed data transmit path;
   a transmission medium having multiple lanes; and
   a receiver coupled to said transmitter via said transmission medium and configured to receive data from said transmitter over at least some of said multiple lanes in both a safe mode and a high speed mode, wherein at least one of said lanes is dedicated to link detection and said transmitter transmits a link detect pattern to said receiver over said at least one of said lanes for said safe mode,
   wherein a minimum hold time for said safe mode is greater than a total of a maximum noise width, a strobe/data skew and a minimum hold time of said receiver.

15. The serial communications link as recited in claim 14 wherein in said safe mode, said transmitter transmits said data to said receiver without deskewing said multiple lanes.

16. The serial communications link as recited in claim 14 wherein said transmission medium includes multiple lanes and each of said lanes are used to transmit data in a high speed mode and less than all of said lanes are used to transmit data in said safe mode.

17. The serial communications link as recited in claim 14 wherein said serial communications link operates in said safe mode, a training mode and said high speed mode, wherein said safe mode is independent of said training mode and said high speed mode is dependent on said training mode.

18. A receiver for a high speed, serial communications link, comprising:
- a receive interface connected to a transmission medium having multiple lanes;
- receiving circuitry coupled to said receive interface and configured to receive data from said transmission medium in a high speed mode; and
- a safe receive circuit, different than said receiving circuitry, coupled to said receive interface and configured to receive data from said transmission medium in a safe mode, wherein in said safe mode at least one of said lanes is dedicated to a link detect signal for link detection,
- wherein a minimum set-up time of said safe mode is greater than a total of a maximum noise width, a strobe/data skew and a minimum set-up time of said receiver, and a minimum hold time of said safe mode is greater than a total of said maximum noise width, said strobe/data skew and a minimum hold time of said receiver.

19. The receiver as recited in claim 18 wherein said safe receive circuit is further configured to determine lane reversal and polarity reversal of at least some of said multiple lanes.

20. The receiver as recited in claim 19 wherein said safe receive circuit is further configured to detect said link detect signal and operate in said safe mode after determining said lane reversal and said polarity reversal.

\* \* \* \* \*